Nov. 4, 1924.
R. B. SMITH
METHOD AND APPARATUS FOR TESTING MATERIALS
Filed Dec. 5, 1921
1,514,236
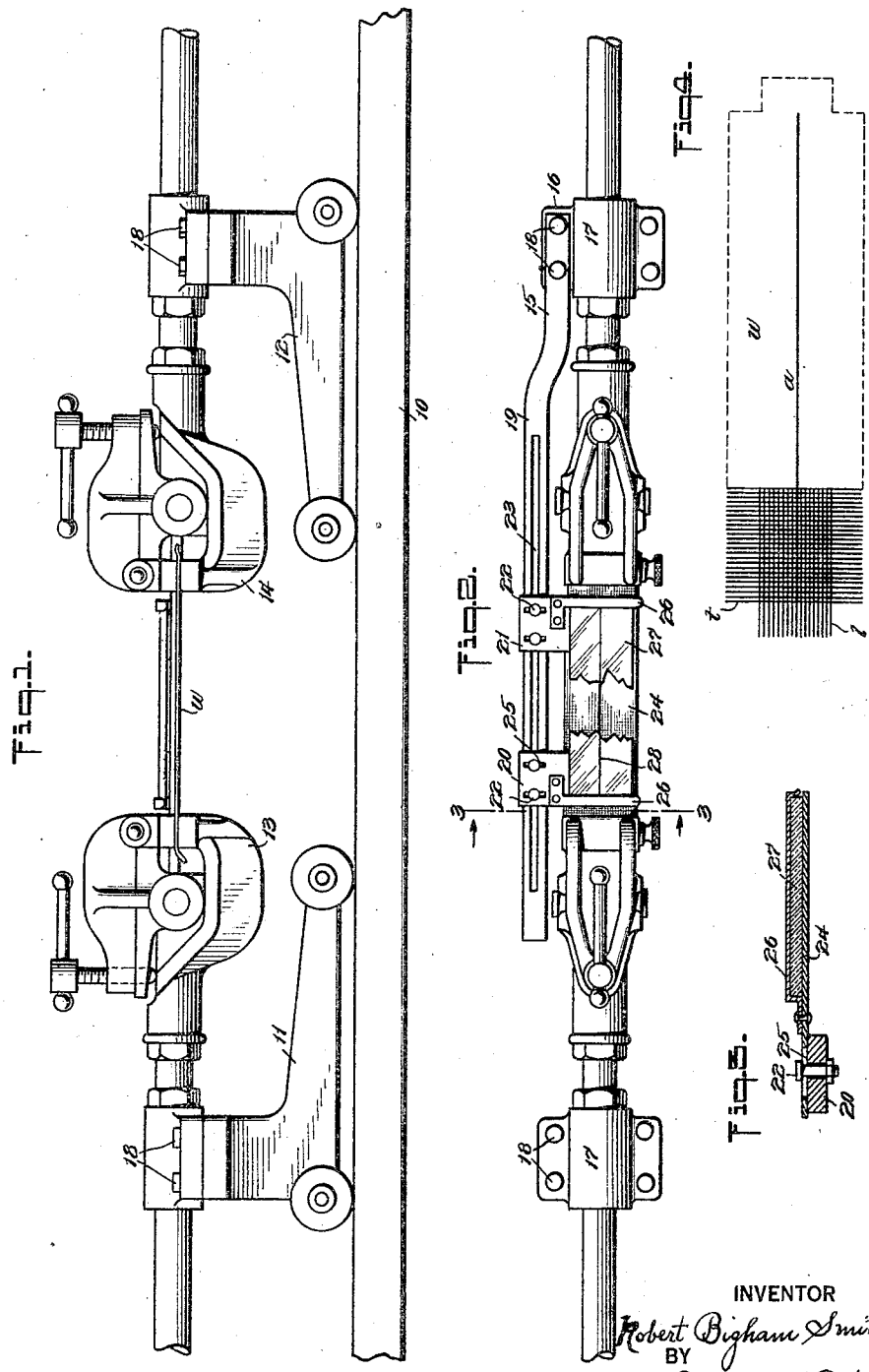
INVENTOR
Robert Bigham Smith
BY
Warren S. Orton.
ATTORNEY Patented Nov. 4, 1924.

1,514,236

UNITED STATES PATENT OFFICE.

ROBERT BIGHAM SMITH, OF MACON, GEORGIA.

METHOD AND APPARATUS FOR TESTING MATERIALS.

Application filed December 5, 1921. Serial No. 519,921.

*To all whom it may concern:*

Be it known that I, ROBERT BIGHAM SMITH, a citizen of the United States, and resident of Macon, in the county of Bibb and State of Georgia, have invented certain new and useful Improvements in Methods and Apparatus for Testing Materials, of which the following is a specification.

The invention relates to a method and apparatus for testing materials when mounted in a stretching machine and specifically relates to an improved means for centering and aligning fabrics when mounted in such machines.

It is the usual practice in testing fabrics to determine their strength and elasticity to cut strips in both the warp direction and in the filling direction to fray the longitudinal edges to leave the requisite width of unfrayed strip and to then mount the strip in some suitable form of testing machine. One such machine now in general use is identified as a jaw pull tester of the inclination balance type and which includes a pair of work clamping jaws constructed to engage opposite ends of the longitudinal strips. As at present practiced the same strip will give different data under succeeding tests and it is assumed that these variations are due largely to the careless manner in which the strip is mounted between the jaws of the testing machine. It is readily appreciated that any variations in subsequent mountings, such as any angularity or variations from parallel between the medial line of the fabric and the loci of the lines of draft between the jaws, would introduce errors and thus seriously affect the value of comparative readings.

Accordingly, one of the objects of the invention is to provide a simplified method for presetting the direction and center of draft to which the fabric is to be subjected. This is attained simply by marking on the strip before it is set up in the machine, a long sight or identification line. This line can, of course, be accurately positioned to extend parallel to the threads and thus insure a true testing of the strength of the fabric in the direction of the threads under test.

Another object of the invention and particularly featuring the mechanical phase of the disclosure, is to provide a simple means for insuring the mounting of the fabric strip in proper position in the testing machine, so that the line of pull or draft on the material under test will be symmetrically disposed on opposite sides of the indicated line on the material and thus reduce strains and friction on the parts of the testing machine.

Under certain conditions it is required that materials be tested in a bone dry state which necessitates the distillation of moisture from the sample, usually by positioning it in a conditioning oven before it is mounted in the testing machine. It is necessary that the dried strip be quickly positioned in the testing machine before the strip can acquire moisture from the air and thus introduce an error into the desired readings.

Accordingly, another object of the invention is to provide a simple form of indicating means for assisting the operator in effecting a quick mounting and in determining the proper position of the sample in the testing machine.

Still another object of the invention is to provide a simple form of centering and aligning means which can be marketed as an attachment for installation in testing machines of the type under consideration to assist in locating the work in such machines.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a view in side elevation showing the work clamping jaw elements of a conventional form of testing machine equipped with a preferred embodiment of my invention;

Figure 2 is a plan view looking down upon the device shown in Figure 1;

Figure 3 is a detailed transverse sectional view taken on the line 3—3 of Figure 2 looking in the direction indicated by the arrows; and Figure 4 is a plan view partially in dotted outline of a strip of fabric to be tested.

In the following description and in the claims, parts will be identified by specific names for convenience of expression but they are intended to be as generic in their application to similar parts as the art will permit.

In the drawings there is shown part of a conventional form of testing machine and which includes a track 10 upon which is mounted a pair of jaw carriages 11 and 12, carrying respectively work clamping jaws 13 and 14 and which jaws are designed to be moved relative to each other so as to stretch and rupture the work W clamped therebetween, all as is well known in operation of testing machines of the inclination balanced type.

Referring to the method feature of this disclosure, it is to be understood that the strip W, which in this case is a square woven automobile tire fabric, includes longitudinal threads $l$ and transverse threads $t$, with the longitudinal threads frayed out as shown in Figure 4 leaving a central unravelled strip of preset width about one inch. The strip is mounted in the machine as shown in Figure 1 with 3 inches between the jaw faces as required by certain standard tests. By following the practice herein suggested a line $a$, which may be simply a pencil line is marked on the fabric before it is mounted in the machine. The line extends longitudinally of the strip, paralleling the longitudinal threads $l$ and positioned at least approximately, if not exactly, midway between the opposite unravelled longitudinal edges. In testing the strip, either by the machine herein disclosed or by any other method, care is exercised that the loci of the line of strain on the strip be apportioned symmetrically on opposite sides of the line $a$ so as to insure a true test in the direction of the preset line.

In order to insure the coincidence of the marked line on the material under test with the center of the line of pull when the material is mounted in a testing machine recourse is had to an indicating or centering device of the type herein disclosed.

Referring to the specific form of the invention disclosed in the drawings the indicating device is shown to be in the form of an attachment 15 demountably secured to some suitable part of the machine or other convenient support. In the form of the machine illustrated the flange 16 of a boss 17 forming part of one of the carriages 12 with its securing bolts 18 provides a convenient means for securing the attachment in place. The attachment includes a long flat arm 19 which constitutes a support extending parallel to the line of movement of the jaws and lapping the same as particularly shown in Figure 2. A pair of glass supporting frames 20 and 21 are slidably mounted on the arm 19 and are adjustably fastened thereto by means of bolts 22 passing through the plate and through a slot 23 formed lengthwise in the arm 19. Each frame includes a bottom plate 24 provided with a pair of transversely extending slots 25 each of which contains one of the bolts 22 and thus provides means for adjusting the plates as a whole transversely of the line of movement of the jaws. These plates are each provided with a spring keeper 26, so arranged that a plate of transparent material 27, such as glass, may be mounted therein in position to extend lengthwise of the line of movement and between the jaws. The glass is demountably held in position on the two plates 24 by means of the spring keepers so that the glass plate can be readily removed and a different sized plate substituted therefor in testing the different materials. The glass plate is provided with a hair line 28 preferably etched on the under side thereof as is usual in marking hair lines on glass. The plate is so set that the hair line will be set accurately relative to the jaws and in such a way that it will extend accurately in a direction parallel to the line of movement between the jaws and will connect the center of the line of pull of one jaw with the corresponding center of the other jaw. Preferably the plate is disposed so as to be relatively close to the work W as shown in Figure 1 and thus minimize any errors due to parallax reading between the line 28 and the line $a$ on the work.

It is obviously within the scope of the disclosure to substitute any other indicating line for the marking on the glass disclosed, and one such equivalent structure is a fine wire or hair stretched between the frames 20 and 21 in place of the glass disclosed in the preferred embodiment of the invention herein illustrated.

In operation, and with the attachment mounted in place and with the proper size glass in position, the frames carrying the glass will be accurately and cautiously adjusted to bring the indicating line in centered position between the jaws. With the jaws in open position to receive the work which has been previously marked with the line $a$ as hereinbefore suggested, it is withdrawn from the conditioning oven, if it is so pretreated, and is quickly clamped in position between the jaws. The necessity for transverse movement of the strip is readily determined simply by having the lines coincide and the preset position of the jaws determine the longitudinal distance between the jaws at the start of the testing operation. The jaws are then screwed into work clamping position engaging the located strip and the machine is set in operation to test the fabric as is well known in the operation of such machines.

By following the method and using the machine herein disclosed it is possible to accurately locate the line of pull on the fabric at right angles to the jaws of the testing machine and to center the fabric in the jaws. In this way the strain on each side of the center of stress is equal or approximately equal and in this way friction on the moving parts of the testing machine is reduced to a minimum and in this way the two strips of the material to be tested is ascertained without the introduction of errors due to friction on parts of the machine not intended to compensate for any such friction.

By means of the machine disclosed it is possible to obtain reading of strength and elasticity from different strips of the same material and which reading will be relatively close to each other thus indicating that successive tests are made under practically identical conditions.

Strains on the fabric have been symmetrically disposed on opposite sides of the longitudinal medial line of the strip and in general an improved actuation of the machine has been attained.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination with a testing machine including a pair of work engaging jaws movable relative to each other in one direction to stretch the work carried therebetween, a transparent plate adapted to be positioned above the portion of the work held between the jaws a support for said plate, said plate provided with an indicating line thereon extending in said direction and connecting the centers of the points of engagement between each jaw and the work engaged thereby.

2. In a device of the class described, the combination with a testing machine including a pair of work engaging jaws movable relative to each other in one direction, to stretch the work carried therebetween, of an attachment for the machine including indicating means adapted to coact with the work in assisting to set the same in position, said means having a prefixed relation to said direction.

3. In a device of the class described, the combination with a testing machine including a pair of work engaging jaws movable relative to each other in one direction to stretch the work carried therebetween, a transparent plate adapted to be positioned above the portion of the work held between the jaws, said plate provided with an indicating line thereon extending in said direction and connecting the centers of the points of engagement between each jaw and the work engaged thereby, and means for securing the plate in adjusted position.

4. In a device of the class described, the combination with a testing machine including a pair of jaws for clamping opposite ends of a piece of work to be tested, of aligning means disposed between the jaws, in position to be adjacent to the work to be tested and extending parallel to said direction of movement of the jaws.

5. A testing machine including a pair of work engaging jaws movable relative to each other to stretch the work therebetween, and indicating means adapted to be disposed between the jaws and relatively close to the work to avoid parallax in determining the proper position of the work in mounting the same in the machine.

6. An attachment for a stretching machine including a support, means for securing the support to the machine in position to extend parallel to the line of stretch in the machine and means providing an indicating line carried by said support and extending lengthwise of the support.

7. An attachment for a testing machine including a support, means for securing the support to the machine, a plate frame adjustably mounted on said support, a transparent plate demountably positioned in said frame, said plate provided with an indicating line adapted to coact with a similar line on the material to be tested.

Signed at Macon, in the county of Bibb and State of Georgia, this 28th day of November, A. D. 1921.

ROBERT BIGHAM SMITH.